(12) United States Patent
Kato et al.

(10) Patent No.: US 6,326,048 B1
(45) Date of Patent: Dec. 4, 2001

(54) PREPARATION METHOD OF DOUGH FOR FLOUR FOODS

(75) Inventors: Akemi Kato; Yasuo Hara, both of Shimane-ken; Eiko Arai, Tokyo-to; Rieko Onishi, Matsue, all of (JP)

(73) Assignee: Hoshizaki Denki Kabushiki Kaisha, Toyoake (JP)

( * ) Notice: Subject to any disclaimer, the term of this patent is extended or adjusted under 35 U.S.C. 154(b) by 0 days.

(21) Appl. No.: 09/145,415

(22) Filed: Sep. 1, 1998

(30) Foreign Application Priority Data

Sep. 2, 1997 (JP) .................................................. 9-237437
Jul. 1, 1998 (JP) ................................................ 10-186442

(51) Int. Cl.$^7$ .................................................. A21D 10/00
(52) U.S. Cl. ........................... 426/549; 426/94; 426/237; 426/247; 426/496
(58) Field of Search .............................. 426/94, 237, 247, 426/330, 549, 496

(56) References Cited

FOREIGN PATENT DOCUMENTS 52-16674 * 2/1977 (JP) .
1463211 * 3/1989 (SU) .

* cited by examiner

*Primary Examiner*—Lien Tran
(74) *Attorney, Agent, or Firm*—Arent Fox Kintner Plotkin & Kahn, PLLC.

(57) ABSTRACT

A preparation method of dough for processed foods such as bread essentially made of wheat flour, wherein electrolyzed water produced by electrolysis of raw water is used for kneading an amount of wheat flour to enhance the quality of the processed foods without using any food additives.

4 Claims, 1 Drawing Sheet

PREPARATION METHOD OF DOUGH FOR FLOUR FOODS

BACKGROUND OF THE INVENTION

1. Field of the Invention

The present invention relates to a preparation method of dough for processed foods essentially made of wheat flour.

2. Description of the Prior Art

In a production process of various kinds of foods essentially made of wheat flour such as bread, pizza, hot cake, pie, crepe and the like, flour ingredient is added with raw water such as city water, well water or the like and kneaded to prepare dough for the flour foods. Thereafter, the dough is subjected to a heat treatment to produce the flour foods. In such a production process of the flour foods, various kinds of additives are mixed with the flour ingredient during the preparation process of the dough to enhance the quality of the flour foods.

SUMMARY OF THE INVENTION

Although in recent years, various kinds of food additives have been developed to enhance the quality of the flour foods, an object of the present invention is directed to effectively utilize the properties of electrolyzed water for enhancing the quality of flour foods without using any food additives.

According to the present invention, there is provided a preparation method of dough for flour foods wherein electrolyzed water produced by electrolysis of raw water is used for kneading an amount of wheat flour for preparation of the dough. In the preparation of the dough, it is preferable that acidic water or alkaline water produced by electrolysis of raw water or neutral water prepared by a mixture of the acidic water and the alkaline water is used for kneading the wheat flour.

The flour foods produced by processing the dough kneaded with the acidic water are superior in property than flour foods produced by processing dough kneaded with city water or well water as described below.

The flour foods are provided in the form of bread, Chinese bun or the like superior in elasticity, pizza, pie, rice cracker or the like superior in crispness, crepe, skin for spring rolls superior in elastic hardness to masticate, and wheat gluten superior in mastication-feel. Since the oxidation-reduction potential of the acidic water is higher than that of the city water or well water, extractive function of protein in the dough is enhanced by oxidative function, and exchange reaction of SH-SS group in molecules of gultenin and gliadin is promoted to form a gluten network in the dough stronger than that in dough prepared by using city water or well water. This is effective to produce processed flour foods superior in the properties described above.

The flour foods produced by processing the dough kneaded with the alkaline water are superior in property than flour foods produced by processing dough kneaded with city water or well water as described below.

The flour foods are provided in the form of bread, French doughnut or the like superior in dampish feel, and hot cake, pancake or the like superior in plump-feel. As the surface-active function of the alkaline water under presence of hydroxyl-ion is higher than that of city water or well water, impregnation of the water into wheat flour is smoothly effected to promote partial swell of starch particles so that the starch is pasted by alkalinity to increase an amount of hydrator. This is effective to enhance the water retention property of dough.

DESCRIPTION OF THE PREFERRED EMBODIMENT

Figure 1:
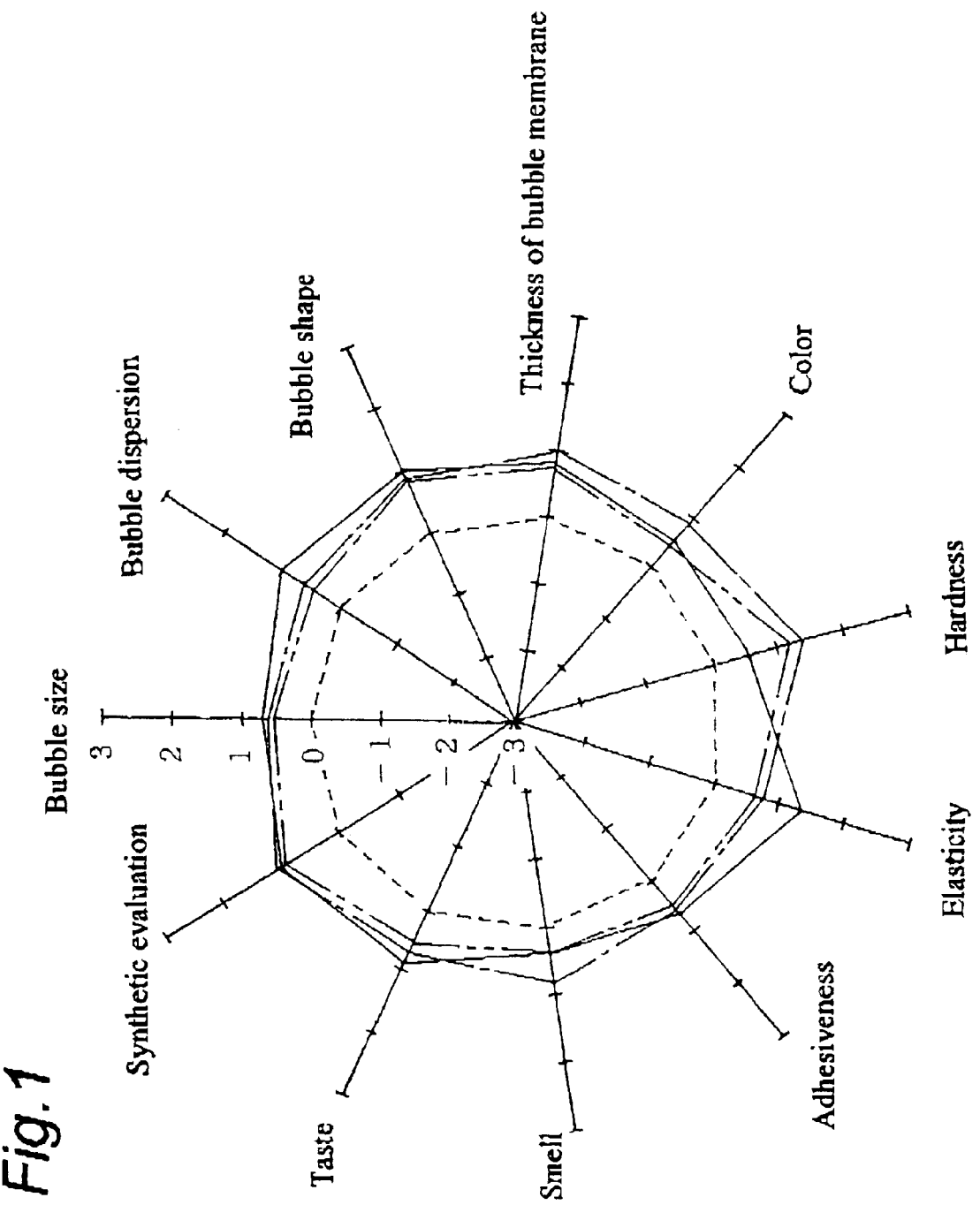
FIG. 1 is a graph showing a result of sensory tests of bread made of dough prepared in accordance with the present invention.

For preparation of dough for processed flour foods, acidic water of pH 2.85 and alkaline water of pH 10.35 produced by electrolysis of city water, neutral water of pH 7.02 prepared by a mixture of the acidic water and alkaline water, and city water of pH 6.95 were used as kneading water for the dough, respectively. The dough was used for making bread, pizza, hot cake, pie, French doughnut, pancake, puff, crepe, rice cracker, Chinese bun, etc.

The properties of the processed flour foods were evaluated by a sensory tests as shown in the following Table 1.

TABLE 1

| | Properties | |
| --- | --- | --- |
| Processed foods | Acidic water | Alkaline water |
| Bread, French doughnut | Elastic | Dampish feel |
| Pizza, Pie, Rice cracker | Crispy feel | |
| Hot cake, Pancake | | Plump feel |
| Puff | | Swelled feel |
| Crepe | | Soft |
| Chinese bun | Elastic | Plump feel |

Hereinafter, a production method of bread in accordance with the present invention will be described. As the ingredient of bread, 280 g of wheat flour, 5 g of shortening, 10 g of sugar, 5 g of skim milk, 5 g of salt, 196 cc of kneading water, 4.2 g of dry yeast and 0.56 g of yeast food were used. For preparation of bread dough, the dry yeast was first put into a cooking pot and heaped up, and the wheat flour, shortening, sugar, skim milk and salt were mixed with the dry yeast in such a manner to avoid direct contact of the dry yeast with the sugar, skim milk and salt. Thereafter, the ingredient of bread was kneaded with an amount of water and successively subjected to primary fermentation, benchtime and secondary fermentation to prepare an amount of bread dough. Thus, the bread dough was baked to turn out a loaf of bread.

As the kneading water for preparation of the bread dough, acidic water of pH 2.85 and alkaline water of pH 10.35 produced by electrolysis of city water, neutral water of pH 7.02 prepared by a mixture of the acidic water and alkaline water and city water of pH 6.95 were used, respectively.

Sensory test:

The baked bread was left at a room temperature for one hour. Thereafter, the inner part of the bread was cut into cubes of 5 cm and applied to a sensory test conducted by a panel of thirty consumers. The sensory test was conducted at eleven items such as the size of bubbles in the bread, dispersion of the bubbles, the shape of bubbles, the thickness of the bubble membrane, color, hardness, elasticity, adhesiveness, smell, taste and synthetic evaluation. In the sensory test, the quality of bread made of the dough kneaded with city water was evaluated as "0", and the quality of each bread made of the dough kneaded with the other water was evaluated as +3 (Best) to −3 (Worst) at seven steps. In the evaluation, the bubble size was rated as small (+3) to large (−3), the dispersion of the bubbles was rated as uniform (+3) to irregular (−3), the bubble shape was rated as oval (+3) to circular (−3), the thickness of the bubble membrane was rated as thin (+3) to thick (−3), the color was rated as white (+3) to non-white (−3), the hardness was rated as soft (+3) to hard (−3), the elasticity was rated as elastic (+3) to non-elastic (−3), the adhesiveness was rated as non-adhesive (+3) to adhesive (−3), the smell was rated as good (+3) to bad (−3), the taste was rated as good (+3) to bad (−3), and the synthetic evaluation was rated as like (+3) to dislike (−3).

Result of Sensory test:

A result of the evaluation is shown in FIG. 1, wherein a solid line represents a result of evaluation of the bread made of the dough kneaded with the acidic water, a dot and dash line represents a result of evaluation of the bread made of the dough kneaded with the alkaline water, a two-dots and dash line represents a result of evaluation of the bread made of the dough kneaded with the neutral water prepared by a mixture of the acidic water and alkaline water, and a dotted line represents a result of evaluation of the bread made of the dough kneaded with the city water.

From the result of the evaluation, it has been found that the bread made of the dough kneaded with the electrolyzed water is highly evaluated at all the items in comparison with the bread made of the dough kneaded with the city water. Particularly, the bread made of the dough kneaded with the acidic water was superior in dispersion and elasticity of bubbles, the bread made of the dough kneaded with the alkaline water was superior in the thickness of the bubble membrane, softness and smell, and the bread made of the dough kneaded with the neutral water was superior in softness.

What is claimed is:

1. A preparation method of dough for use in processed foods essentially made of wheat flour, the method comprising the step of kneading an amount of wheat flour with water for preparation of the dough wherein only electrolyzed water produced by electrolysis of the water is used for the kneading; and wherein the electrolyzed water is acidic water produced by electrolysis of raw water.

2. A preparation method of dough for use in processed foods essentially made of wheat flour, the method comprising the step of kneading an amount of wheat flour with water for preparation of the dough wherein only electrolyzed water produced by electrolysis of the water is used for the kneading; and wherein the electrolyzed water is alkaline water produced by electrolysis of raw water.

3. The preparation method of dough as claimed in claim 1, wherein acidic water of pH 2.85 is used as the acidic water for kneading the wheat flour.

4. The preparation method of dough as claimed in claim 2, wherein alkaline water of pH 10.35 is used as the alkaline water for kneading the wheat flour.

* * * * *